Figure 4:
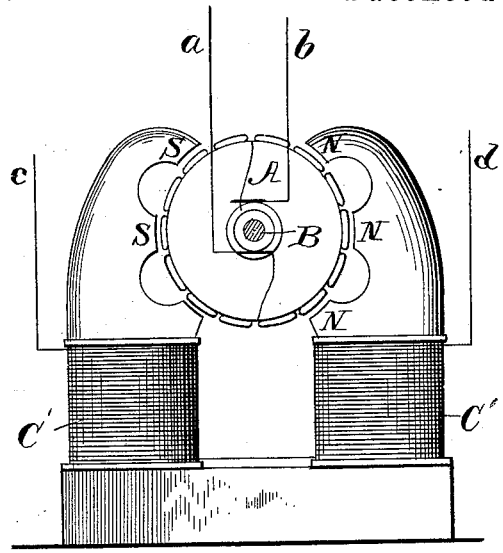

(No Model.) 2 Sheets—Sheet 1.
E. THOMSON.
ALTERNATING CURRENT GENERATOR OR MOTOR.
No. 545,554. Patented Sept. 3, 1895.
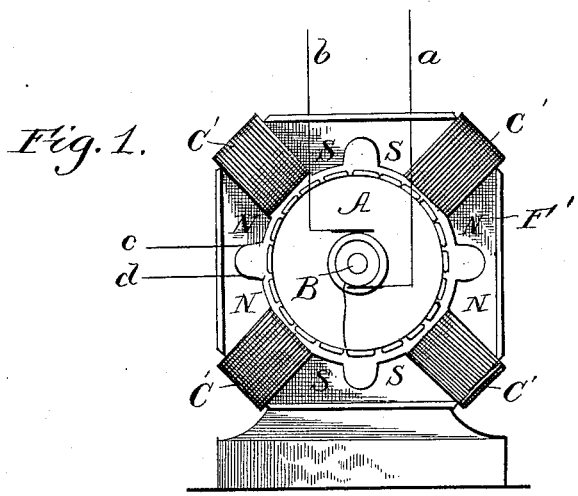
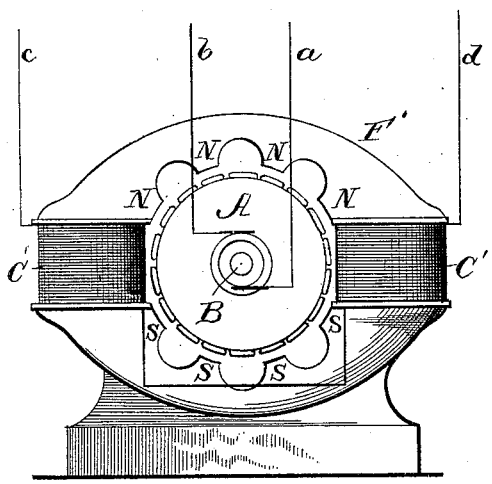
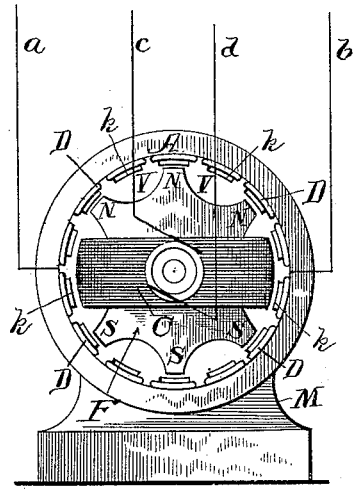
Witnesses:
J. B. McGirr.
T. F. Conroy
Inventor:
Elihu Thomson
By H. S. Townsend
Atty.

(No Model.) 2 Sheets—Sheet 2.
E. THOMSON.
ALTERNATING CURRENT GENERATOR OR MOTOR.

No. 545,554. Patented Sept. 3, 1895.

Witnesses:
J. B. McGirr.
T. F. Courey

Inventor:
Elihu Thomson
By H. L. Townsend
Atty.

UNITED STATES PATENT OFFICE.

ELIHU THOMSON, OF SWAMPSCOTT, MASSACHUSETTS.

ALTERNATING-CURRENT GENERATOR OR MOTOR.

SPECIFICATION forming part of Letters Patent No. 545,554, dated September 3, 1895.

Application filed September 29, 1891. Serial No. 407,130. (No model.)

*To all whom it may concern:*

Be it known that I, ELIHU THOMSON, a citizen of the United States, and a resident of Swampscott, in the county of Essex and State of Massachusetts, have invented a certain new and useful Alternating-Current Generator or Motor, of which the following is a specification.

My present invention relates to the construction of dynamo-electric machines suitable for generating alternating-currents or for use on alternating-current circuits as motive-power devices.

The object of my invention, considering the machine as a generator, is to reduce the number of coils in the machine necessary for obtaining a given number of alternations of current with a given speed of rotation of the machine.

A further object of my invention is to reduce the heating of the machine.

My invention consists, essentially, in the combination of field and armature electromagnets, one having a series of coils or bobbins alternately reversed in winding and the other having its poles subdivided into separate polar projections acting each as a pole and spaced according to the scale of spacing for the bobbin-poles of the other, as will be hereinafter more fully described.

In the accompanying drawings I have shown in the five several figures different forms of machine in side elevation embodying my invention.

Referring first to Figure 3, A is an electromagnet, forming in this case the armature of the machine and stationary, although it might be movable, as indicated in Fig. 2.

D indicate a series of coils or bobbins spaced around the inner circumference of the iron ring or cylinder A, and connected into a series circuit with one another with the successive bobbins reversely wound. The bobbins are preferably applied to iron projections $k$, as shown, although the magnetic and electric conditions would be satisfied if the centers of the coils were empty and the poles were air fields, as indicated in Fig. 2. In the construction shown in Fig. 3 the first and last ends of the series of coils are connected to the circuit wires or poles $a\,b$, respectively, so that current in all of them will flow for tension, although several circuits might be led therefrom. Any desired connections may indeed be made without departing from my present invention. The armature A is preferably built up of disks of thin sheet-iron, magnetically separated from each other, firmly held together by bolts, and supported upon a suitable base M.

F is another electromagnet, constituting the field-magnet and arranged to revolve with its poles in proximity to the coils, bobbins, or poles of A. This field-magnet is wound with a coil C, which is fed with currents of one direction from any suitable source, such as a separate dynamo or a commuted portion of the current generated in the coils D. Each of the two poles of the magnet F is subdivided into separate poles or polar projections N N N S S S, as indicated, by forming the pole with cut-away portions V V, or by other construction giving the effect of separate poles which direct the magnetism upon the coils D or cores thereof through separate paths. In the present case three separate polar projections are shown for each pole, although there might be a greater or lesser number, as found desirable, and as determined also by the number of coils or poles for A. The spacing of the projections N S is, however, important, and must be according to the scale of spacing of the coils or poles D $k$, so that the projections N N N or S S S may act simultaneously on coils and poles D $k$. As shown in the drawings, in any given arc of circumference of the magnet A there are twice as many coils D as poles N N or S S, so that the spacing of the polar projections is twice as great as that of the coils D. The space between an extreme polar projection N and the nearest extreme polar projection S is such as to include two of the coils D, instead of one, as in the case of contiguous polar projections N N or S S. This is necessary in order that the influence of poles S may coact with poles N in developing current of the same direction in the whole endless series of coils. As will be seen, poles N being opposite or approaching right-hand windings of coils D, polar projections S would be opposite or approaching left-hand windings, so that the direction of current in the connected series of coils would be the same. This matter of neutral space and connection of coils D to one another or to the outside circuit may be varied, as is well understood by electricians, without departing from my invention. To obtain the best results for a given construction of machine, I, however, prefer to make the neutral space small and to make the gaps V long enough to take in one coil D only.

The machine operates as follows: The revolution of the field F produces alternating currents in the coils D, as follows: The approach of a pole of the field F, as N, creates an impulse of current in a coil, which current ceases when the coil is over the cut-away portion V of the field. The pole N of the field F then advances toward the next coil D of the armature, which, however, is wound in a reverse direction to the preceding coil, so that the wave or impulse of current is now generated in an opposite direction. It will thus be seen that an alternating current is continually developed in the coils D, those coils which would tend to develop antagonistic currents being situated over the cut-away portions of the field-magnet and therefore idle. At the same time the separate polar projections S S S operate upon the coils D in the same manner to produce the currents which will flow in series with those produced by N N N to the terminals of the whole series of coils, for the reason before explained.

In Fig. 2 the armature is made the rotary portion, while the field-magnet F', which is provided with coils at C', has its poles formed with four separate projecting portions N N N N for its north pole and four S S S S for its south pole, providing multiple paths for the completion of the magnetic circuit and producing, as before, waves or impulses of current alternating in direction.

In the modification indicated in Fig. 1, four separate coils C' are shown; but each pole of the field-magnet is subdivided, as before, into separate polar projections. In this instance each pole has two only. The space from each pair of polar projections to the next around the circumference of the armature is, as before, made such that while a north projection N acts on one pole or direction of winding polar projections S will act on opposite windings.

Figure 5:
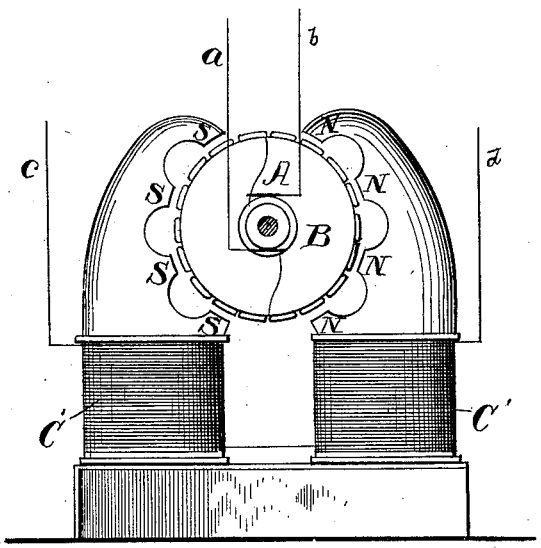

In Figs. 4 and 5 I have shown the application of the invention to a machine having a different form of field-magnet. In Fig. 4, the armature having but fourteen coils, a subdivision of each pole of the magnet into but three polar projections is required in order to secure the best effect, while in Fig. 5, there being a larger number of bobbins on the armature, the subdivision is increased to four.

It is obvious that either magnet might be the field or exciting magnet, although I prefer to make that one the field-magnet which has its poles subdivided, its coils being indicated at C'. The currents generated in the coils D, Fig. 3, can be led directly to the external circuit. In Figs. 2, 4, and 5 they are collected by the usual collecting-rings placed upon the armature-shaft. The armature-coils in Figs. 1 and 2 are shown also as flat coils lying upon the surface of the armature, though it will be understood in some cases it might be desirable to have cores projecting from the center about which the coils were wound, or again to employ a Gramme armature instead.

By my invention I obviate the necessity of winding a great number of field-bobbins, and this decreases the cost of manufacturing, increases the simplicity of construction, and lessens the liability of contacts formed in winding or by leakage of current of high potential, such as is usually employed in alternating-current apparatus. I also secure ample ventilation, the polar faces being in direct contact with the atmosphere, and by this means the efficiency of the machine is greatly increased. Again, I greatly lessen the labor required in planing, filing, and fitting the poles for the reception of bobbins, which labor is necessary to be performed when the coils are placed upon each pole.

What I claim as my invention is—

1. In an alternating current motor or generator, the combination substantially as described, of a field magnet and an armature magnet one having a series of coils and the other having its poles subdivided into separate polar projections spaced according to the scale of spacing of the poles for the first.

2. In an alternating current motor or generator, the combination substantially as described, of an armature having a series of bobbins, and a field magnet having each of its poles subdivided into separate polar projections whose spaces are twice the space of the bobbins of the armature.

3. The combination substantially as described, of an armature having a series of windings which are alternately reversed, and a field magnet having poles each subdivided into separate polar projections, as and for the purpose described.

Signed at Lynn, in the county of Essex and State of Massachusetts, this 22d day of September, A. D. 1891.

ELIHU THOMSON.

Witnesses:
JOHN W. GIBBONEY,
BENJAMIN B. HULL.